Dec. 20, 1966  A. CARMI  3,293,023

GLASS PRESS MOLD SENSING AND INDICATING MEANS

Filed March 23, 1964

INVENTOR.
ARIEH CARMI
BY
Sughrue, Rothwell, Mion & Zinn
ATTORNEYS

United States Patent Office 3,293,023
Patented Dec. 20, 1966

3,293,023
GLASS PRESS MOLD SENSING AND
INDICATING MEANS
Arieh Carmi, Corning, N.Y., assignor to Corning Glass
Works, Corning, N.Y., a corporation of New York
Filed Mar. 23, 1964, Ser. No. 353,761
4 Claims. (Cl. 65—153)

This invention relates to improvements in the art of glass pressing, and particularly relates to a unique means for sensing and indicating the presence of glass at selected locations in a glass press mold.

In glass presses, a gob of molten glass of measured volume or weight is deposited in a predetermined position in the bottom of a mold cavity. Then a plunger is forced into the mold and a ring closes the space between the plunger and mold at the top of the mold cavity. The force of the plunger causes the glass gob to flow into the space defined by the mold cavity, plunger and ring until this space is filled. In the manufacture of glass articles by press molding it is highly desirable to have the glass uniformly fill the cavity defined by the mold, plunger and ring combination. That is, the glass forced by the plunger should reach and contact all portions of the ring at the same time. If the glass contacts one portion of the ring prematurely it will be subjected to higher pressures and create defects in the glass articles molded, e.g. checks, blemishes, and another portion of the cavity may remain unfilled. If it can be determined which side of the ring has premature contact with the glass, then the defects can be corrected by adjusting the placement of the charge or gob. It is a primary object of this invention to provide a simple and rugged means for determining the relative time at which the glass reaches the ring periphery and provide a signal indicating the direction and magnitude of correction necessary for adjusting the equipment for proper operation.

In a glass pressing operation after the glass has completely filled the cavity the plunger pressure is relieved and the plunger may be withdrawn. This invention provides a means for signalling when the last point on the ring has been contacted by glass, i.e. when the cavity is filled. This signal may be utilized to relieve pressure on the plunger or if desired to retract the plunger and ring.

In loading a measured gob of glass in the mold bottom it is important to locate it so that the plunger will force it to fill the cavity uniformly. The glass sensing and signalling means of this invention could also be located in the mold bottom to provide an indication of proper placement of the gob charge.

Other objects of the invention will be pointed out in the following description and claims and illustrated by the accompanying drawing, which discloses by way of example, the principle of the invention and the best mode which has been contemplated of applying that principle.

Figure 1:
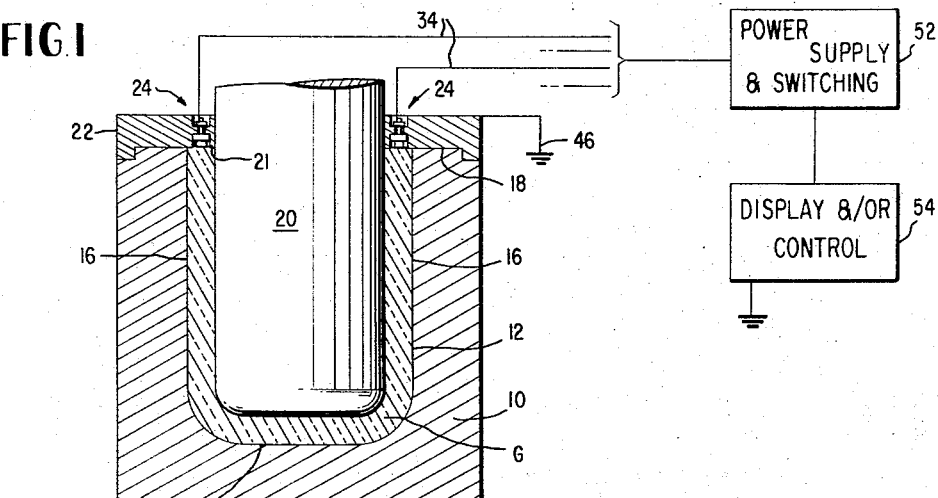
FIG. 1 is a sectional view taken through a glass mold plunger and ring combination illustrating the glass indicating the sensing and signalling means of this invention somewhat schematically.

This invention provides an arrangement for determining the presence of glass within a glass mold cavity defined by a mold, plunger and ring combination. This glass presence may be utilized to indicate the uniformity of filling of the mold or the position of placement of the charge and the signal as produced may be used to display the filling pattern or automatically adjust the equipment for optimum operation. The glass presence sensing unit operates on the principle that glass is an electrical conductor at the temperatures encountered during glass pressing. Each sensing unit includes a sensing pin of conductive material held within but insulated from its conductive support (ring or mold) so that when glass contacts the pin and the conductive ring or mold a circuit is made through the glass and a signal can be obtained for indication or control purposes.

Referring now more specifically to the drawing, a glass press mold 10, somewhat schematically shown, includes a cavity 12 of a predetermined shape having a bottom 14 and side walls 16. The mold also has a top 18. A plunger 20 having an outside configuration of predetermined shape is forced by means well known in the art, but not shown, forwardly into the mold onto a measured gob of glass G placed as a charge in the bottom of the mold. A ring 22 is also movable downwardly onto the top 18 of the mold 10 to close and form a cavity defined by the inside of the glass mold 12, the outside of the plunger 20 and bottom 21 of the ring 22.

Figure 2:
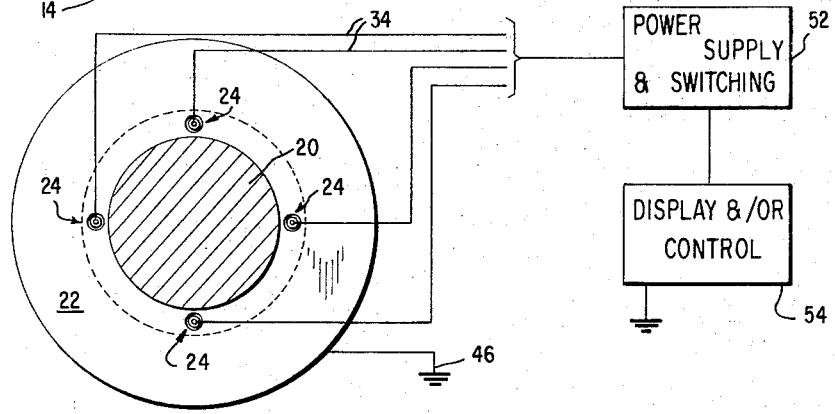
FIG. 2 is a top plan view of the glass press mold of FIG. 1 illustrating the positioning of the glass presence sensing units.

The plunger forces the gob of glass to fill the mold and for optimum operation the mold should be filled uniformly so that the glass forced upwardly by the plunger contacts all portions of the under side of the ring 22 at the same time. If this does not happen one side of the ring is subject to more pressure than the other and the glassware so produced has checks and blemishes at this point. Also, a certain portion of the cavity might not be filled. This invention provides a plurality of glass presence sensing units 24 positioned at critical points and extending vertically downward into the ring 22. On a cylindrical object such as that illustrated in FIG. 1, four pins positioned 90° apart as shown in FIG. 2 may be used. It will be understood, however, that there could be more than four glass presence sensing units and, for example, if the article molded were not symmetrical it would be preferred to place the sensing units at critical locations. The glass sensing unit is shown in more detail in FIG. 3 and includes a pin 26 of electrically conductive material having a lower surface 28 and a stem 30 carrying a holding and adjusting nut 37 threaded thereon. An electrical conductor 34 is suitably connected to the stem 30 of the pin 26, for example a washer between nuts 35 and 37.

Figure 3:
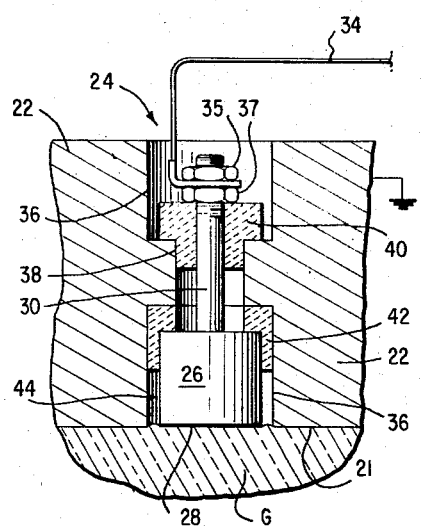
FIG. 3 is a detail view of the glass presence sensing unit carried by the ring.

The pin 26 is positioned in a hole 36 in the ring. The hole 36 includes a projecting land 38 and the pin is held from this land by means of high temperature insulating washers 40 and 42 in the manner shown in FIG. 3. It is noted that washer 42 does not extend down to the surface of glass G thereby leaving a small air gap 44. This spacing between the pin 26 in the ring 22 is as close as possible to avoid resistance loss in the circuit through the glass G, as a smaller gap will provide a better signal. However, the air space 44 will have to be wide enough to prevent arcing thereacross or through the insulation. A further consideration is the marking that the air gap 44 will leave on the glass. As shown in FIG. 3 the glass will attempt to enter slightly into the air gap 44. However, in ordinary operation a gap in the order of .005 to .010 inch won't leave much of a mark on the top of the glass article produced; and the width of the air space 44, in addition to the factors mentioned above, depends on the glass used and the temperature. It is further noted that any slight markings that are produced on the upper edge of the glas article are on the surface that is normally retouched or refinished in a secondary finishing operation, and therefore any markings produced by the glass moving slightly into the air space 44 will be obliterated in these secondary finishing operations.

As shown in FIG. 2, the glass sensing units 24 may be positioned 90° apart and are connected through the conductors 34 to a power supply and switching arrangement 52 and this in turn may be connected to a display for the sensed presence of the glass thereby displaying the filling pattern. Also, the sensed glass presence could be used for control purposes; for example a control to relieve the pressure of the plunger 20, or control for positioning and locating the next measured gob in the bottom 14 of the mold 10. The ring 22 is also a conductor and may be grounded as at 46 to complete the electrical circuit.

Figure 4:
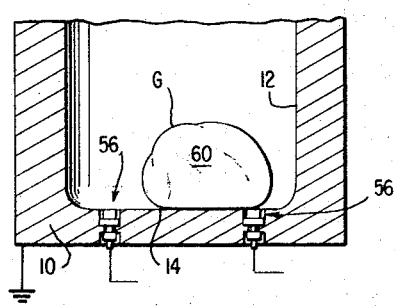
FIG. 4 is a schematic sectional view of a modification illustrating the glass presence sensing units positioned in the bottom of a glass mold cavity.

FIG. 4 illustrates a modification of the invention in which the sensing units 56 identical or at least similar in construction to sensing unit 24 are positioned in the bottom 14 of the mold cavity 12 for sensing the presence of the measured and loaded gob charge 60. Since the location of the gob charge also affects the filling of the mold, the exact location of the charge is highly desirable information and if the charge is off center and the article produced is defective because of uneven filling then the next time the mold is charged the gob may be repositioned accordingly.

It is thought that the operation of the invention is evident from the foregoing description. However, a brief summary of the glass presence sensing unit will be described. In operation, the mold cavity 12 is filled with a gob of glass of measured volume or weight and the plunger 20 moves into the mold forcing the glass up and the ring 22 closes the top of the mold. As the glass reaches the bottom 21 of the ring 22 it will also contact the bottom 28 of pins 26 at their selected or critical locations. A circuit from the power supply 52 through conductor 34 and pin 26 is completed through the glass G across the air gap 44 to the ring 22 and ground 46 if the glass fills the mold or otherwise contacts pin 26. With the glass completing the circuit, the results of sensing the glass presence may be used for a suitable display 54 of the filling pattern or can be used for control of the equipment, for example to automatically adjust it for optimum operation.

While there have been shown and described and pointed out the fundamental novel feature of the invention as as applied to the preferred and illustrated embodiments, it will be understood that various omissions and substitutions and changes in the form and details of the invention illustrated and in its operation may be made by those skilled in the art without departing from the spirit of the invention. It is the intention, therefore, to be limited only as indicated by the scope of the following claims.

What is claimed is:

1. In a glass press including a glass molding cavity defined by an electrically conductive mold, plunger and ring, an arrangement for determining the presence and position of molten high temperature and electrically conductive glass when it is placed as a gob in the bottom of the mold, said arrangement comprising; a plurality of electrical contacts carried by the electrically conductive mold in the bottom surface thereof, the contacts positioned at spaced points around the bottom of the mold at equal distances from the center thereof, insulating means insulating each of the plurality of contacts from the conductive mold so that electrically conducting glass gob contacting any one of the contacts in the mold will complete a circuit to that contact, the glass and the mold, and means for reading out the signal made by completing said circuit.

2. In a glass press including a glass molding cavity defined by a mold, plunger, and electrically conductive ring, an arrangement for determining the presence of molten high temperature and electrically conductive glass at the top of the cavity, said arrangement comprising; a plurality of electrical contacts carried by the electrically conductive ring which defines a top portion of the cavity, the contacts positioned at spaced points around the ring, insulating means insulating each of the plurality of contacts from the conductive ring so that electrically conducting glass contacting any of the contacts and the ring will complete a circuit through that contact, the glass and the ring, and means for reading out the signal made by completing said circuit.

3. A glass press as defined in claim 2 wherein the contacts are flat bottomed pins having their bottom surface substantially flush with the bottom of the ring, while extending vertically through the ring.

4. A glass press as defined in claim 2 wherein the electrical contacts comprise a pin having a bottom surface and carried in a hole larger than the pin in the conductive carrying member and where the insulating means are high temperature insulating washers spacing the pin from the carrying member within the hole while providing a small air gap between the edges of the pin and the carrying member at the surface of the pin to be contacted by the glass.

References Cited by the Examiner

UNITED STATES PATENTS

| 656,189 | 8/1900 | Heerdt | 65—158 |
| 2,053,938 | 9/1936 | Barker | 65—158 |
| 2,490,785 | 12/1949 | De Vany | 73—516 |
| 2,863,014 | 12/1958 | Deer et al. | 73—516 |

DONALL H. SYLVESTER, *Primary Examiner.*

S. LEON BASHORE, *Examiner.*

G. R. MYERS, *Assistant Examiner.*